3,038,869
MULTI-COLOR COATING COMPOSITION
Donald A. Hilliard, Cuyahoga Falls, Ohio, assignor to
   The Goodyear Tire & Rubber Company, Akron, Ohio,
   a corporation of Ohio
No Drawing. Filed Aug. 28, 1959, Ser. No. 836,622
              9 Claims. (Cl. 260—8)

This invention relates to multi-colored coating compositions and particularly to those containing a resinous copolymer of a conjugated diene hydrocarbon and a vinyl aromatic monomer as the film forming ingredient.

Multi-color coating compositions are well known as evidenced by the Zola patent, U.S. 2,591,904, and later patents including Schwefsky, U.S. 2,658,002, and Lesser, U.S. 2,809,119. The latter two patents concern a nitrocellulose coating which has many disadvantages including high solvent costs, unpleasant odor, fire hazard, low hiding power, and lifting of previous paint coats.

An object of this invention is to provide a multi-colored coating composition containing an oil phase dispersed in a water phase, the oil phase comprising discrete particles of resinous film former dissolved in a solvent.

Another object of this invention is to provide a multi-colored coating composition the particles of the oil phase having a predetermined shape ranging from spheres through a grass seed-like shape to stringy masses, all shapes being useful in producing a multi-colored coating having a decorative effect and the shape of the oil particles being controlled by means of a novel combination of oil thickening and water stabilizing agents.

The coating composition of this invention is adaptable for spray application whereby a multi-colored and decorative film is deposited on a surface, the film being made up of a plurality of areas of distinctive colors each held in a resinous binder. The film forming binder of the coating composition of this invention comprises the resinous copolymer resulting from the polymerization of a mixture containing a monomer of the conjugated diene hydrocarbon class and a monomer of the vinyl aromatic hydrocarbon class, including butadiene-1,3, isoprene, styrene, alphamethyl styrene, vinyl toluene, and similar monomers of these classes wherein 75 to 95% of the vinyl aromatic hydrocarbon is copolymerized with 25 to 5% of the conjugated diene hydrocarbon under conventional conditions used to bring about the polymerization of those monomers as shown for example in U.S. Patent 2,611,719.

A particularly desirable lacquer-type drying resin soluble in aliphatic hydrocarbon solvents is made by copolymerizing 85 parts of vinyl toluene with 15 parts of butadiene-1,3 in an aqueous emulsion containing any well-known catalyst including an organic hydroperoxide such as benzoyl peroxide, a perborate, a percarbonate or a water-soluble peroxygen catalyst, such as an alkali (sodium, potassium, or ammonia) salt of persulfuric acid and particularly potassium persulfate in amounts from about 0.01 to 1.0% based on the total amount of monomer present and a surface active dispersing agent in amount from about 1.5% to 10% based upon the amount of water present, carried out at any convenient temperature from about 0° C. to 100° C. This particular copolymer of vinyl toluene and butadiene-1,3 is desirable as the binder in the manufacture of multi-colored coating compositions because its odor is hardly detectable, it may be used with economical and low odor solvents, it has excellent ability to bind the pigment portion of the paint, it can be heavily loaded with pigment thereby insuring excellent hiding power, there is no tendency for the paint to lift a prevoius layer of the same or different paint when sprayed thereon, it has a high flash point (106° F.) thus producing a relatively non-inflammable coating and it has excellent resistance to alkalies.

The coating composition of this invention is made by first preparing an oil or enamel phase by conventional practice using for example a pebble mill or a three roll mill to form a dispersion of coloring pigments and pigment extenders such as clay, with the film forming polymer, and modifying resins, plasticizers, dryers, gums, and solvents. The resulting enamel phase is then treated with a thickener which is made by dispersing a montmorillonite derivative into a solvent solution of the film forming resin by stirring the mixture with a high-speed agitator until the mixture becomes of uniform consistency. The thickener is then added to the enamel phase by stirring until a uniform thickened enamel phase is obtained. The viscosity of the thickened enamel phase should be between about 30,000 to about 150,000 cps. The resulting thick mixture is then dispersed in a properly treated water phase to form discrete particles of the oil phase in the water phase. The water phase is made by dissolving a protective colloid in enough water to produce a water phase viscosity of about .0002 to .0006 times the viscosity of the thickened enamel or the thickened enamel is from 6,000 to 15,000 times more viscous than the water phase.

It has been discovered that in order to bring about a desired dispersion of the discrete particles of the oil phase containing the particular film former in the water phase, it is necessary to use an 8 to 40 carbon containing alkyl complex or derivative of montmorillonite and particularly an alkylamine complex derivative of montmorillonite as the thickener which is swellable in the oil phase and to use a water soluble or water dispersible protective colloid, particularly hydroxyethyl cellulose, methyl cellulose, carboxymethyl cellulose, sodium carboxymethyl cellulose, polyvinyl alcohol and polyhydric alcohols as the stabilizer in the water phase. Additional protective colloids useful as stabilizers in the invention include proteins such as casein, carbohydrates which are recognized as efficient agents for promoting emulsification of oil in water, such as gum acacia and gum tragacanth, gelatin, albumin, the sodium salts of fatty acids, containing at least 14 carbon atoms such as sodium oleate, pectin and finely divided solids such as barium sulfate and colloidal clay. It has been observed that this particular combination of thickener and stabilizer may be used in various ratios so as to bring about any result desired in regard to dispersion, particle size and shape of the oil phase.

The alkyl-amine complexes or derivatives of montmorillonite are to be used in amounts from about 0.5% to about 5% by weight based on the oil phase of the coating composition. Higher amounts of the montmorillonite complexes or derivatives have no beneficial effect on bringing about the desired dispersion of the oil in the water phase. Amounts substantially lower than 5% do not produce the stable dispersions commercially desirable for multi-color paints.

The protective colloids useful as stabilizers for the water phase are to be used in amounts between about 0.30% and about 5.0% based on the total oil and water phase being used. The ratio of oil to water may range from 1 to 162 parts of oil per 100 parts of water.

The following examples illustrate how various colors of enamel may be made all useful in making the multi-colored coating composition of this invention. All parts are by weight unless otherwise indicated.

Enamel Masterbatches

| Ingredients | Red | Green | Yellow | Black | White | Blue |
|---|---|---|---|---|---|---|
| Indian Red Iron Oxide | 108.7 | | | | | |
| CP Chrome Oxide Green | | 106.7 | | | | |
| Hansa Yellow G | | | 59.1 | | | |
| Lamp Black | | | | 43.8 | | |
| Titanium Dioxide Rutile | | | | | 151.5 | 156.1 |
| Phthalocyanine Blue | | | | | | 17.4 |
| Clay (ASP-100—an inert clay pigment extender consisting of 45.42% SiO₂ and 38.79% Al₂O₃) | 96.5 | 106.6 | 177.4 | 175.2 | 61.5 | 34.7 |
| Pliolite VT (85 butadiene/15 vinyl toluene resinous binder) | 149.1 | 125.4 | 167.6 | 193.6 | 132.4 | 136.4 |
| Chlorinated Paraffin (40% chlorinated paraffin hydrocarbon liquid plasticizer) | 14.9 | 12.6 | 16.8 | 19.4 | 13.2 | 13.6 |
| China-Wood Oil (raw) | 7.5 | 6.3 | 8.4 | 9.7 | 6.6 | 6.8 |
| Soya Lecithin | | | | | | 2.1 |
| Mineral Spirits (aliphatic hydrocarbon) | 480.0 | 497.8 | 419.0 | 414.3 | 493.6 | 487.2 |
| Total (parts by weight of ingredients per 100 gallons) | 856.7 | 855.4 | 848.3 | 856.0 | 858.8 | 854.3 |
| Viscosity of enamel (cps.) | 121 | 101 | 2,050 | 2,880 | 187 | 356 |

Each of the above enamels was made by grinding the respective ingredients in a pebble mill for sixteen hours.

Thickened Enamel Masterbatch

| | Parts |
|---|---|
| Enamel (as above) | 50.0 |
| Methanol | 1.0 |
| Bentone 38 (distearyldimethylammonium montmorillonite) | 1.0 |

The methanol and Bentone 38 are stirred into the enamel to bring about the desired thickening of the enamel phase as follows: Red 84,000 cps., green 76,000 cps., yellow 112,000 cps., black 53,600 cps., white 60,800 cps., and blue 69,600 cps.

Stabilized Water Phase

| | Parts |
|---|---|
| Stabilized water solution | 50.0 |
| Thickened enamel masterbatches: | |
| (Red) | 15 |
| (White) | 15 |
| (Blue) | 20 |

The enamel phases are then stirred into the water phases one at a time to cause each enamel phase in turn to become divided into particles having a grass seed-like shape or other desirable shape and permanently dispersed in the water phase.

The resulting multi-colored paint was deposited on a vertical wall surface through a De Vilbiss internal mix spray gun held at a distance of 4 feet from the wall surface and operated at an air pressure of twenty pounds per square inch. The multi-colored pattern formed under these conditions comprises a plurality of colored areas, each area being of a different irregular shape with blue predominating in the pattern and forming a blue background while a foreground effect is produced by white and red areas all creating a pleasing decorative effect. To produce a finer particle background color the air pressure for the spray gun is increased to 65 p.s.i. and the nozzle of the gun is held 8 inches from the surface being sprayed. Very large and abstract particles of paint are produced on the background when the thickener for the oil phase is used in amounts of from 3% to 5% while the use of less than about 3% and particularly .5% to 3% produces a smaller fleck of paint particle or a smoother background of color. The montmorillonite derivatives used in this invention may be made by several methods well known in the art. The montmorillonite complexes or derivatives useful in this invention may be prepared by immersing 118 grams of the clay mineral montmorillonite in 3 liters of water and after standing for one hour decanting the dispersion to obtain approximately 100 grams of the clay mineral montmorillonite free of the coarse non-clay sediment consisting of approximately 8.5 grams of feldspars and quartz. To the montmorillonite is then added the desired organic base which is first converted to a salt by the addition of acetic or hydrochloric acid dissolved in water to the montmorillonite dispersion in the ratio of 100 milli-equivalents of the organic base per 100 grams of clay. The resulting precipitate is washed by filtering and repulping for removal of salts, then filtered, dried in an air circulating oven at 65° C., and pulverized in a hammer mill.

The following amine derivatives or complexes of montmorillonite may be made in accordance with the foregoing general description, each of which is useful in the present invention:

(1) Octylammonium montmorillonite (8 carbons)
(2) Hexadecylammonium montmorillonite (16 carbons)
(3) Disebacyldimethylammonium montmorillonite (22 carbons)
(4) Dimethyldidodecylammonium montmorillonite (26 carbons)
(5) Distearyldimethylammonium montmorillonite (38 carbons)

While certain representative embodiments and details have been shown for the purpose of illustrating the invention, it will be apparent to those skilled in this art that various changes and modifications may be made therein without departing from the spirit or scope of the invention.

I claim:

1. A coating composition of the lacquer-in-water type including a lacquer phase comprising a solution of a resinous copolymer of a conjugated diene hydrocarbon and a vinyl aromatic hydrocarbon in a solvent for the resinous copolymer and which is substantially immiscible with the water phase, said solution being dispersed in the form of discrete particles in water, said solution containing an alkylamine derivative of montmorillonite as a thickening agent, the alkyl radical containing from 8 to 40 carbon atoms, and said water phase containing a protective colloid present in an amount sufficient to produce a water phase having a viscosity of between about .0002 to .0006 times the viscosity of the lacquer phase and to produce a stable dispersion of the lacquer-in-water type and capable of producing on drying a smooth continuous film.

2. A coating composition of the lacquer-in-water type which comprises a dispersion of particles of a resinous material in an aqueous dispersing medium containing a water soluble protective colloid, said resinous material being a polymer of a conjugated diene hydrocarbon and a vinyl aromatic hydrocarbon and dissolved in a solvent for the resinous copolymer and substantially immiscible in water and containing an alkaylamine derivative of montmorillonite as a thickening agent in amount sufficient to produce a lacquer-in-water type of dispersion, a lacquer phase having a viscosity of between about 30,000 to about 150,000 cps. and the alkyl radical containing from 8 to 40 carbon atoms, the protective colloid being present in an amount sufficient to produce a water phase having a viscosity of between about .0002 to .0006 times the viscosity of the lacquer phase.

3. A coating composition of the lacquer-in-water type capable of forming a multi-colored continuous film when sprayed in one operation upon a surface, which composition comprises a dispersion of differently colored viscous particles containing a resinous polymer of a conjugated diene hydrocarbon and a vinyl aromatic hydrocarbon dissolved in a solvent for the resinous copolymer and immiscible in water and thickened with an alkylamine derivative of montmorillonite, the alkyl radical containing from 8 to 40 carbon atoms in a continuous water phase containing a water soluble protective colloid present in amount sufficient to produce in combination with said thickener a stable lacquer-in-water dispersion in which the lacquer phase has a viscosity of between about 6,000 to about 15,000 times more viscous than the water phase.

4. The composition of claim 1 in which the montmorillonite derivative is octylammonium montmorillonite.

5. The composition of claim 1 in which the montmorillonite derivative is hexadecylammonium montmorillonite.

6. The composition of claim 1 in which the montmorillonite derivative is dimethyldidodecylammonium montmorillonite.

7. The composition of claim 1 in which the montmorillonite derivative is disebacyldimethylammonium montmorillonite.

8. The composition of claim 1 in which the montmorillonite derivative is distearyldimethylammonium montmorillonite.

9. The composition of claim 1 in which the protective colloid is selected from the group consisting of hydroxyethyl cellulose, methyl cellulose, carboxymethyl cellulose, sodium carboxymethyl cellulose, polyvinyl alcohol, casein, gum acacia, gum tragacanth, geatin, albumin, sodium oleate, pectin, barium sulfate and colloidal clay.

References Cited in the file of this patent

UNITED STATES PATENTS

| | | |
|---|---|---|
| 2,658,002 | Schwefsky | Nov. 3, 1953 |
| 2,795,562 | Jud | June 11, 1957 |
| 2,809,119 | Lesser | Oct. 8, 1957 |
| 2,847,380 | Zakin | Aug. 12, 1958 |
| 2,865,871 | Johnson et al. | Dec. 23, 1958 |
| 2,876,207 | Henderson | Mar. 3, 1959 |
| 2,892,804 | Crissey | June 30, 1959 |